United States Patent
Matsushita

(10) Patent No.: US 12,117,604 B2
(45) Date of Patent: Oct. 15, 2024

(54) WAVELENGTH VARIABLE OPTICAL FILTER

(71) Applicant: SEIKO EPSON CORPORATION, Tokyo (JP)

(72) Inventor: Tomonori Matsushita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 483 days.

(21) Appl. No.: 17/558,063

(22) Filed: Dec. 21, 2021

(65) Prior Publication Data
US 2022/0206284 A1 Jun. 30, 2022

(30) Foreign Application Priority Data

Dec. 24, 2020 (JP) .................... 2020-214759

(51) Int. Cl.
G02B 26/00 (2006.01)
G02B 5/26 (2006.01)

(52) U.S. Cl.
CPC ............ *G02B 26/002* (2013.01); *G02B 5/26* (2013.01)

(58) Field of Classification Search
CPC ........ G02B 26/002; G02B 5/26; G02B 5/284; G02B 5/28
See application file for complete search history.

(56) References Cited

U.S. PATENT DOCUMENTS

| | | | | |
|---|---|---|---|---|
| 8,319,169 B2 * | 11/2012 | Funasaka | ................. | G02B 5/28 359/578 |
| 8,618,463 B2 * | 12/2013 | Funasaka | ................. | G02B 5/28 359/578 |
| 8,817,268 B2 * | 8/2014 | Sano | ..................... | G01J 1/0488 359/578 |
| 8,848,196 B2 * | 9/2014 | Nishimura | ........... | G02B 26/001 356/519 |
| 8,917,451 B2 * | 12/2014 | Nishimura | ........... | G02B 26/001 359/578 |
| 8,937,276 B2 * | 1/2015 | Funasaka | ................. | G02B 5/28 359/578 |
| 9,234,795 B2 * | 1/2016 | Sano | ..................... | G02B 26/001 |
| 9,291,502 B2 * | 3/2016 | Nishimura | ............... | G01J 3/26 |
| 9,459,387 B2 * | 10/2016 | Funasaka | ................. | G02B 1/10 |
| 9,534,954 B2 * | 1/2017 | Matsuno | ............. | G02B 26/001 |
| 9,557,554 B2 * | 1/2017 | Nishimura | ........... | G02B 26/001 |
| 9,703,092 B2 * | 7/2017 | Shinto | ....................... | G02F 1/21 |
| 9,921,402 B2 * | 3/2018 | Yamazaki | ................ | G01J 3/26 |
| 9,939,629 B2 * | 4/2018 | Matsushita | ............. | G02B 5/26 |

(Continued)

FOREIGN PATENT DOCUMENTS

JP 2019045599 A 3/2019

*Primary Examiner* — Bao-Luan Q Le
(74) *Attorney, Agent, or Firm* — Pramod Chintalapoodi

(57) ABSTRACT

The wavelength variable optical filter includes a first substrate, a second substrate, and a bonding film, the bonding film is in contact with a first reflective film and a second reflective film to thus join the first substrate with the second substrate, the bonding film has transparency with respect to light of a predetermined wavelength range, and an optical path extending through the first reflective film, the bonding film, and the second reflective film has transparency with respect to light of the predetermined wavelength range and has no peak of transmittance with respect to a wavelength range measured by the wavelength variable filter.

4 Claims, 8 Drawing Sheets

(56) References Cited

U.S. PATENT DOCUMENTS

| | | | | |
|---|---|---|---|---|
| 10,330,917 B2* | 6/2019 | Saito | | G02B 26/001 |
| 10,473,913 B2* | 11/2019 | Sano | | G02B 5/284 |
| 10,684,463 B2* | 6/2020 | Saito | | G02B 5/284 |
| 10,838,125 B2* | 11/2020 | Sano | | G02B 26/001 |
| 10,901,200 B2* | 1/2021 | Sano | | G02B 26/001 |
| 11,493,748 B2* | 11/2022 | Saito | | G01J 3/26 |
| 2010/0226029 A1* | 9/2010 | Funasaka | | G02B 27/0006 |
| | | | | 359/850 |
| 2011/0228396 A1* | 9/2011 | Shinto | | G03F 7/70575 |
| | | | | 359/578 |
| 2012/0019812 A1* | 1/2012 | Shinto | | C22C 5/06 |
| | | | | 356/213 |
| 2012/0044570 A1* | 2/2012 | Kitahara | | G01J 3/51 |
| | | | | 359/589 |
| 2012/0045618 A1* | 2/2012 | Yamazaki | | G01J 3/26 |
| | | | | 156/182 |
| 2012/0050869 A1* | 3/2012 | Nishimura | | G02B 26/001 |
| | | | | 359/589 |
| 2012/0188646 A1* | 7/2012 | Sano | | G01J 3/50 |
| | | | | 359/578 |
| 2012/0300208 A1* | 11/2012 | Sano | | G02B 26/001 |
| | | | | 356/402 |
| 2013/0037703 A1* | 2/2013 | Funasaka | | G02B 1/10 |
| | | | | 359/578 |
| 2013/0044377 A1* | 2/2013 | Nishimura | | G02B 26/06 |
| | | | | 359/578 |
| 2013/0075596 A1* | 3/2013 | Matsuno | | G02B 26/001 |
| | | | | 250/226 |
| 2013/0107262 A1* | 5/2013 | Nishimura | | G01J 3/027 |
| | | | | 356/416 |
| 2013/0114083 A1* | 5/2013 | Sano | | G02B 26/001 |
| | | | | 356/416 |
| 2014/0009761 A1* | 1/2014 | Nishimura | | G01J 3/027 |
| | | | | 356/402 |
| 2014/0078588 A1* | 3/2014 | Funasaka | | G02B 5/20 |
| | | | | 359/578 |
| 2014/0192412 A1* | 7/2014 | Imai | | G01J 3/26 |
| | | | | 359/513 |
| 2014/0268342 A1* | 9/2014 | Matsushita | | G01J 3/0229 |
| | | | | 359/578 |
| 2014/0268345 A1* | 9/2014 | Sano | | G02B 26/0841 |
| | | | | 359/584 |
| 2015/0085366 A1* | 3/2015 | Funasaka | | G02B 27/0006 |
| | | | | 359/578 |
| 2015/0138640 A1* | 5/2015 | Matsushita | | G02B 5/26 |
| | | | | 359/578 |
| 2015/0253564 A1* | 9/2015 | Shinto | | G02B 26/001 |
| | | | | 359/578 |
| 2016/0091644 A1* | 3/2016 | Saito | | G01J 3/26 |
| | | | | 359/582 |
| 2016/0209638 A1* | 7/2016 | Shinto | | G03F 7/70575 |
| 2018/0129035 A1* | 5/2018 | Sano | | G01J 3/26 |
| 2018/0172886 A1* | 6/2018 | Sano | | G02B 5/28 |
| 2019/0146206 A1* | 5/2019 | Saito | | G01J 3/26 |
| | | | | 359/582 |
| 2019/0155015 A1* | 5/2019 | Sano | | G01J 3/26 |
| 2020/0264425 A1* | 8/2020 | Saito | | G02B 5/284 |

\* cited by examiner

WAVELENGTH VARIABLE OPTICAL FILTER

The present application is based on, and claims priority from JP Application Serial Number 2020-214759, filed Dec. 24, 2020, the disclosure of which is hereby incorporated by reference herein in its entirety.

BACKGROUND

1. Technical Field

The present disclosure relates to a wavelength variable optical filter.

2. Related Art

There is disclosed, in JP 2019-45599 A, a wavelength variable filter including a pair of substrates facing each other, a pair of reflective films disposed at mutually facing surfaces of the pair of substrates, and a bonding film bonding the pair of substrates, for example. The wavelength variable filter is configured to selectively extract light of a wavelength corresponding to the gap between the pair of reflective films.

Unfortunately, when the bonding film functions as the wavelength variable filter, there is a risk that light of a predetermined wavelength may be incident, as stray light, from the bonding film onto between the pair of reflective films, resulting in an issue of reducing the reliability of the wavelength variable filter.

SUMMARY

A wavelength variable optical filter includes a first substrate including a first filter region and a first bonding region, a second substrate including a second filter region and a second bonding region, and a bonding film located between the first bonding region of the first substrate and the second bonding region of the second substrate, in which the first filter region and the second filter region correspond to a wavelength variable filter, the first substrate includes a first base body and at least one first reflective film, the at least one first reflective film being located on the first base body within the first filter region and within the first bonding region, the second substrate includes a second base body and at least one second reflective film, the at least one second reflective film being located on the second base body within the second filter region and within the second bonding region, the bonding film is in contact with the first reflective film and the second reflective film to thus join the first substrate with the second substrate, the bonding film has transparency with respect to light in a predetermined wavelength range, and an optical path extending through the first reflective film, the bonding film, and the second reflective film has transparency with respect to the light in the predetermined wavelength range, the optical path having no peak of transmittance with respect to a wavelength range measured by the wavelength variable filter.

DESCRIPTION OF EXEMPLARY EMBODIMENTS

A description of the first embodiment will be given.

Figure 1:
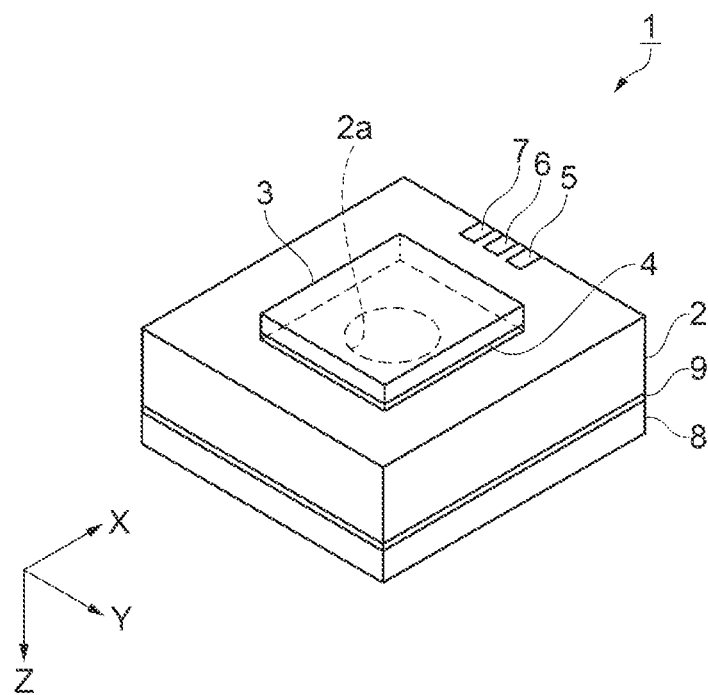
FIG. 1 is a perspective view illustrating a structure of an optical module.
Figure 2:
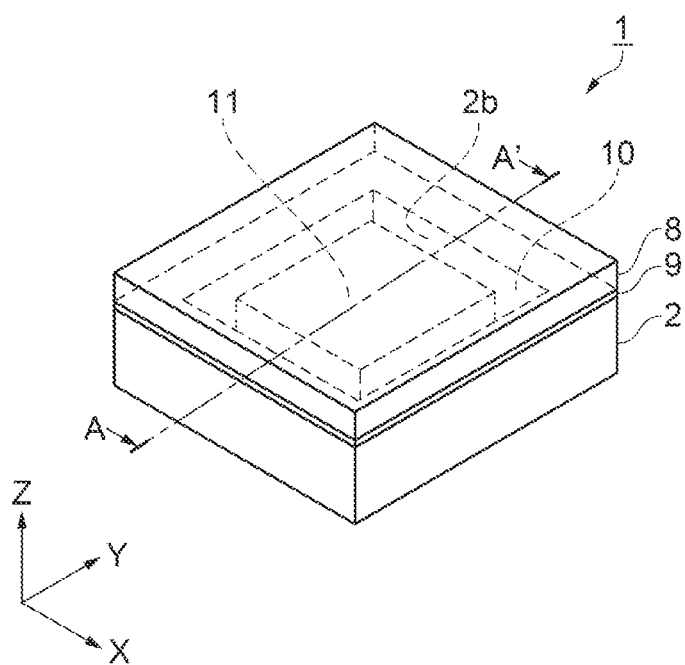
FIG. 2 is a perspective view illustrating a structure of an optical module.

First, a structure of an optical module 1 including a wavelength variable optical filter 11 will be described with reference to FIGS. 1 and 2. FIG. 1 is a perspective view of the optical module 1 as viewed from the side of a first lid body 3. FIG. 2 is a perspective view of the optical module 1 as viewed from the side of a second lid body 8.

The optical module 1 has a substantially rectangular parallelepiped shape, as illustrated in FIG. 1. Note that, in FIG. 1, a lower direction from the optical module 1 is designated as a Z direction, and two directions orthogonal to the Z direction are designated as an X direction and a Y direction. The X direction, the Y direction, and the Z direction are directions along sides of the optical module 1, respectively, and are directions orthogonal to one another.

The optical module 1 includes a housing 2 in a bottomed square tubular shape. A first hole 2a in a circular shape is formed at the center of the housing 2. The first lid body 3 is disposed on the housing 2 so as to seal the first hole 2a. The housing 2 and the first lid body 3 are joined by first low melting point glass 4. A first terminal 5, a second terminal 6, and a third terminal 7 are installed on the side of the X direction from the housing 2. The second lid body 8 is disposed on the side of the Z direction from the housing 2. The housing 2 and the second lid body 8 are joined together by second low melting point glass 9.

The first lid body 3 and the second lid body 8 are formed by silicate glass having light transmittivity. It is sufficient for the material of the housing 2 to be a material having a linear expansion coefficient close to the first lid body 3 and the second lid body 8, where the material is ceramic, for example.

A second hole 2b in a quadrangular shape is formed on the side in the Z direction from the housing 2, as illustrated in FIG. 2. The second hole 2b is a larger hole than the first hole 2a. The second lid body 8 is disposed on the side in the Z direction from the housing 2 so as to seal the second hole 2b. An internal space 10 enclosed by the housing 2, the first lid body 3, and the second lid body 8 forms a sealed space. The wavelength variable optical filter 11 is disposed in the internal space 10. That is, the housing 2, the first lid body 3, and the second lid body 8 form an accommodation portion, and the wavelength variable optical filter 11 is accommodated inside the accommodation portion.

The optical module 1 has a size of a thickness in the Z direction of approximately 3 mm, a width in the X direction of approximately 15 mm, and a width in the Y direction of approximately 15 mm, for example. The second lid body 8 has a thickness of approximately 1 mm. The wavelength variable optical filter 11 has a size of a thickness in the Z direction of approximately from 0.7 mm to 1.5 mm, and a width in the X direction and the Y direction of approximately from 11 mm to 12 mm, for example.

Next, a structure of the wavelength variable optical filter 11 will be described with reference to FIG. 3.

Figure 3:
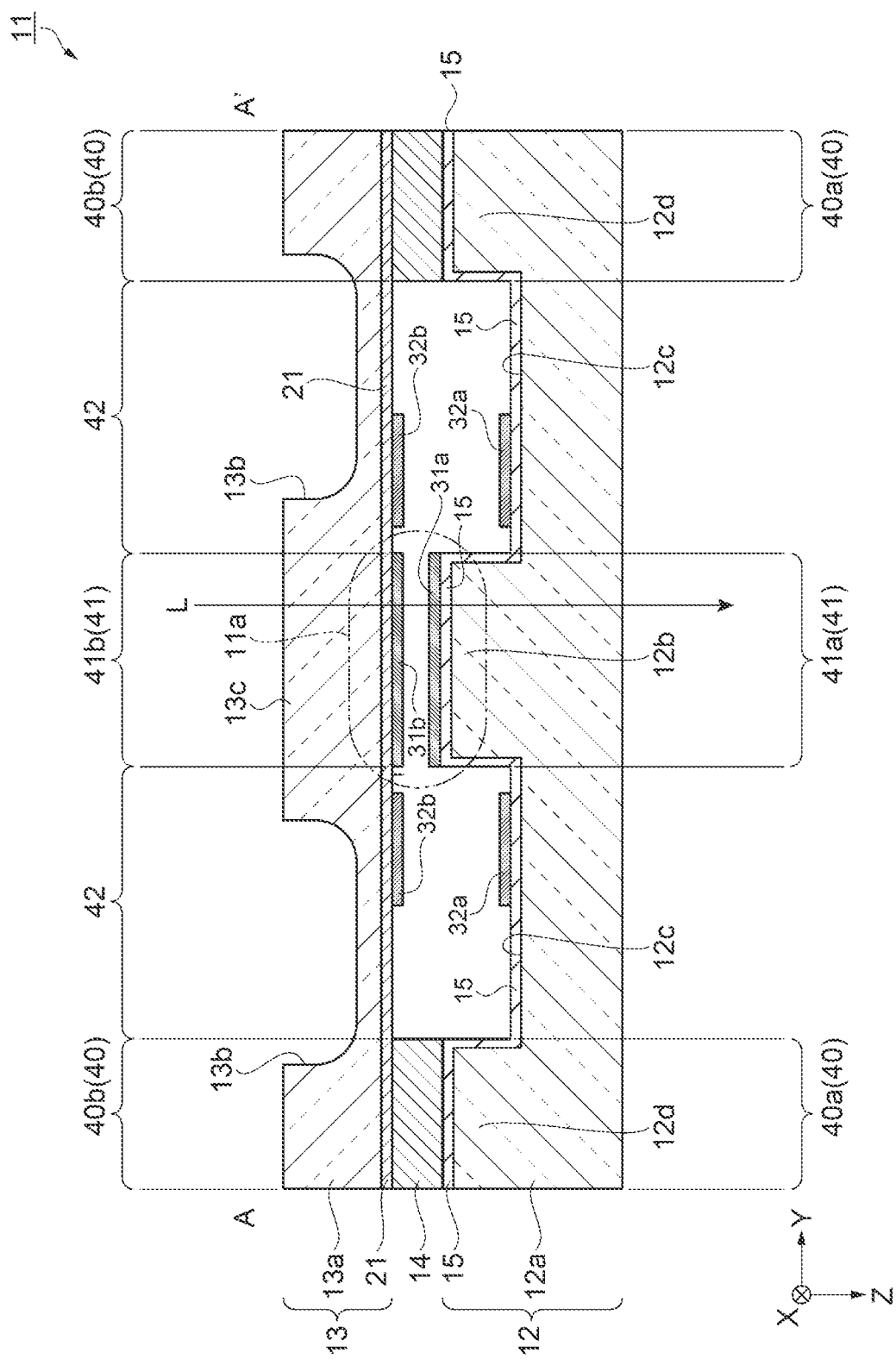
FIG. 3 is a cross-sectional view illustrating a structure of a wavelength variable optical filter of the first embodiment.

The wavelength variable optical filter 11 includes a first substrate 12 including a first base body 12a and at least one first reflective film 15, a second substrate 13 including a second base body 13a and at least one second reflective film 21, and a bonding film 14 disposed between the first substrate 12 and the second substrate 13, as illustrated in FIG. 3.

Specifically, the wavelength variable optical filter 11 includes a filter region 41 that functions as an optical filter, a movable region 42 located around the filter region 41, and a bonding region 40 located at the outermost periphery of the wavelength variable optical filter 11.

A reflective film mounting portion 12b in as cylindrical shape that protrudes in the −Z direction is provided in the filter region 41 located at the center portion of the first base body 12a. An electrode film mounting groove 12c in a ring-shape concave shape is provided in the movable region 42 around the reflective film mounting portion 12b. A first bonding portion 12d protruding in the −Z direction is provided in the bonding region 40 around the electrode film mounting groove 12c.

Note that, in the first substrate 12, a region corresponding to the filter region 41 is designated as a first filter region 41a. Also, in the first substrate 12, a region corresponding to the bonding region 40 is designated as a first bonding region 40a.

Further, in the second substrate 13, a region corresponding to the filter region 41 is designated as a second filter region 41b. Further, in the second substrate 13, a region corresponding to the bonding region 40 is designated as a second bonding region 40b.

Here, it is assumed that the bonding film 14 is disposed between the first bonding region 40a of the first substrate 12 and the second bonding region 40b of the second substrate 13. Also, it is assumed that the first filter region 41a and the second filter region 41b correspond to the regions constituting a wavelength variable filter 11a.

It is sufficient for the material of the first base body 12a to be a material that light L transmits, and is glass silicate, for example. Examples of the silicate glass include various glass such as soda glass, crystalline glass, quartz glass, lead glass, potassium glass, borosilicate glass, and alkaline-free glass, and crystal, for example. The first substrate 12 has a thickness from 500 μm to 1000 μm, for example.

The first reflective film 15 is disposed over the entire surface on the side in the −Z direction from the first base body 12a. The description of the first reflective film 15 will be given in detail later.

A fixed electrode 31a is disposed on the first filter region 41a of the first base body 12a so as to cover the first reflective film 15. A first electrode 32a is disposed in the movable region 42 of the first base body 12a.

The second reflective film 21 is disposed over the entire surface on the side in the Z direction from the second base body 13a. The description of the second reflective film 21 will be given in detail later.

A groove 13b is provided, so as to encircle the filter region 41, on an opposite side from the side on which the second reflective film 21 is disposed in the second base body 13a. A portion, in the second base body 13a, encircled by the groove 13b is designated as a movable portion 13c. The movable portion 13c is disposed so as to face the reflective film mounting portion 12b of the first substrate 12.

As such, the thickness of the second base body 13a is reduced at the portion where the groove 13b is formed at the second substrate 13. Thus, the movable portion 13c is configured to easily move in the Z direction. The material of the second base body 13a is not particularly limited as long as the material transmits the light L and has strength, and is the same material as that of the first base body 12a, for example.

A movable electrode 31b is disposed at the second filter region 41b of the second base body 13a so as to cover the second reflective film 21. A second electrode 32b is disposed at the movable region 42 of the second base body 13a.

The materials of the fixed electrode 31a and the movable electrode 31b contain Indium Tin Oxide (ITO), for example. Note that a transparent and conductive material such as Indium Gallium Oxide (IGO), Indium Doped Oxide (ICO), or the like may be used without being limited to the ITO.

It is sufficient for the materials of the first electrode 32a and the second electrode 32b to be materials having conductivity and are easy to form a film, that is, ITO, for example, Note that a metal film such as tungsten nitride (TiW) may be used without being limited to the ITO.

Next, a configuration of a bonding portion 45 of the wavelength variable optical filter 11 will be described with reference to FIGS. 4 and 5.

Figure 4:
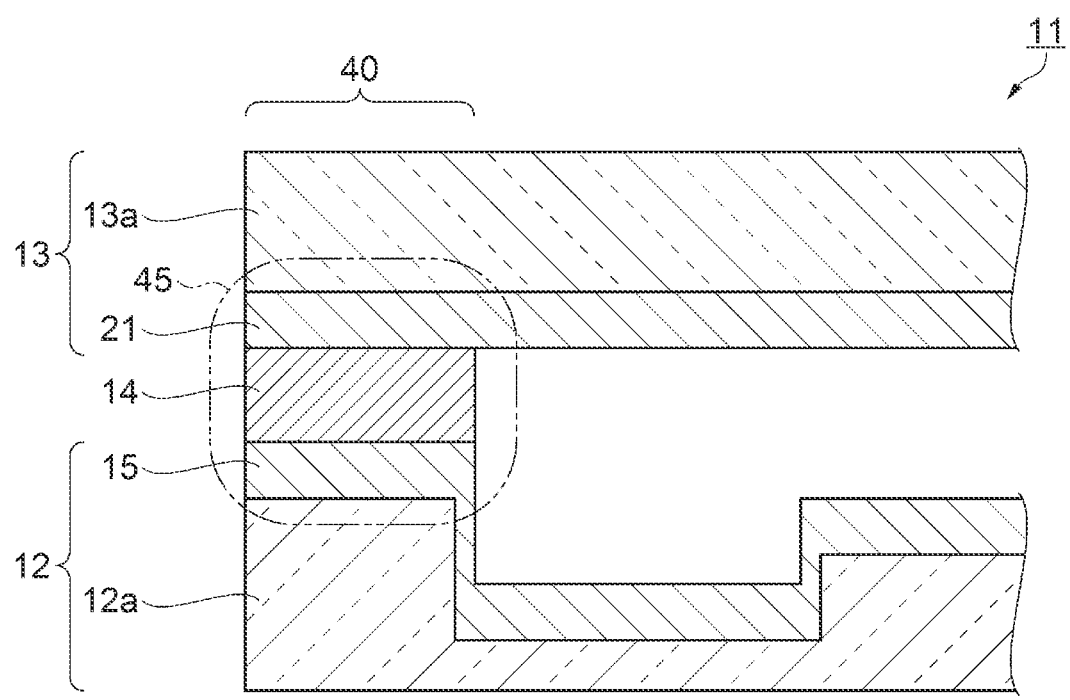
FIG. 4 is a cross-sectional view illustrating a structure of a part of a wavelength variable optical filter.

The wavelength variable optical filter 11 includes, as described above, the first base body 12a, the first reflective film 15, the second base body 13a, the second reflective film 21, and the bonding film 14 bonding the first substrate 12 with the second substrate 13, as illustrated in FIG. 4.

Figure 5:
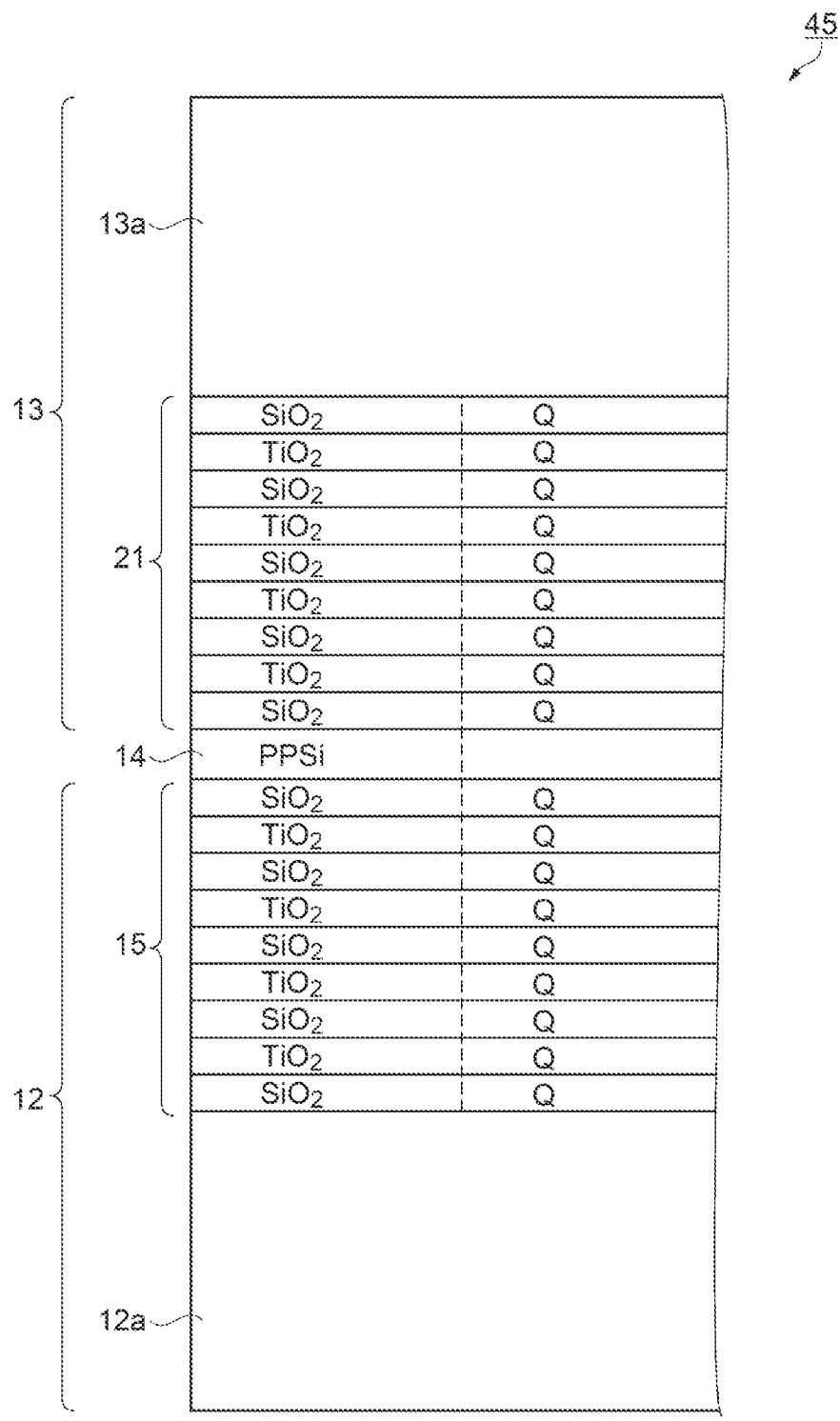
FIG. 5 is a cross-sectional view illustrating a configuration of a bonding portion.

The bonding portion 45 includes a plurality of the first reflective films 15 disposed on the side of the first base body 12a, a plurality of the second reflective films 21 disposed on the side of the second base body 13a, and the bonding film 14 making contact with the first reflective film 15 and the second reflective film 21 in order to join the first substrate 12 with the second substrate 13, as illustrated in FIG. 5.

The plurality of the first reflective films 15 and the plurality of the second reflective films 21 form a multilayer film mirror in which silicon oxide ($SiO_2$) and titanium oxide ($TiO_2$) are alternately layered. In the first embodiment, the plurality of the first reflective films 15 are constituted by nine layers, for example. The plurality of the second reflective films 21 are constituted by nine layers, for example. The bonding film 14 is a PPSi film (for example, a film formed of activated $SiO_2$), for example.

Here, it is assumed that the film thickness of the bonding film 14 is Q, the peak wavelength of the light L transmitted through the bonding film 14 is A, and the refractive index of the bonding film 14 is n. The film thickness Q of the bonding film 14 is set, based on the formula below, to have a peak of the light L of a wavelength λ in a wavelength band that is not included in the variable range of the peak wavelength of the light L extracted at the filter region 41, and it is preferred that the film thickness Q be set such that the wavelength λ has no peak of transmittance in the wavelength range measured by the wavelength variable filter 11a.

$$Q = \lambda/4n.$$

Specifically, the peak wavelength of the light L extracted at the filter region 41 is set to 1000 nm when measuring using the wavelength variable filter 11a, for example. The wavelength of the light L transmitted through the bonding film 14 is set to be in a wavelength band other than 1000 nm because the wavelength of the light L of a peak wavelength of 1000 nm is avoided from being transmitted through the bonding portion 45.

Figure 6:
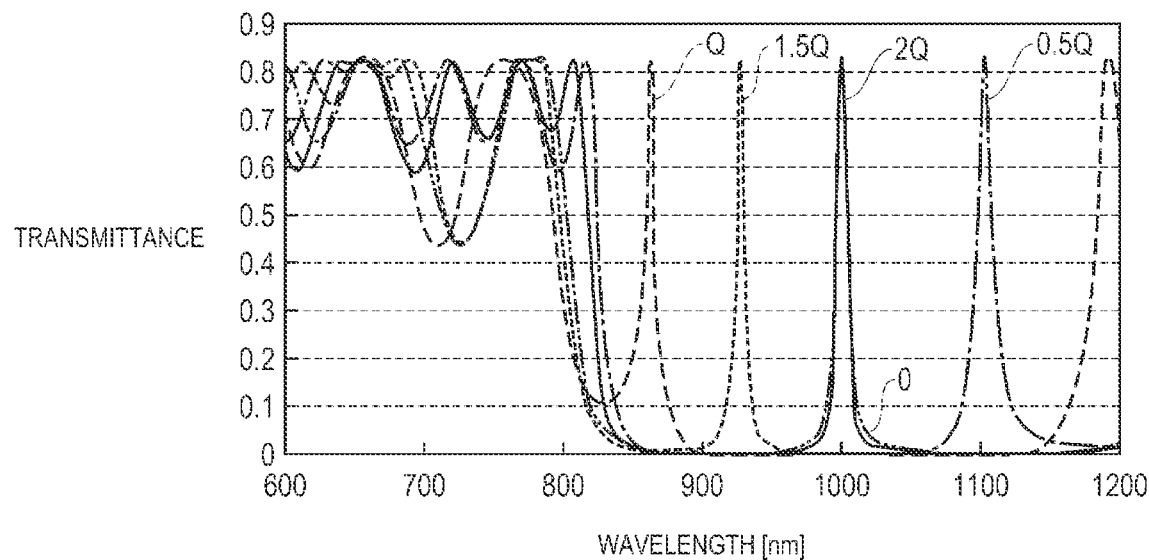
FIG. 6 is a graph illustrating a relationship between a wavelength and transmittance at a bonding portion.
Figure 7:
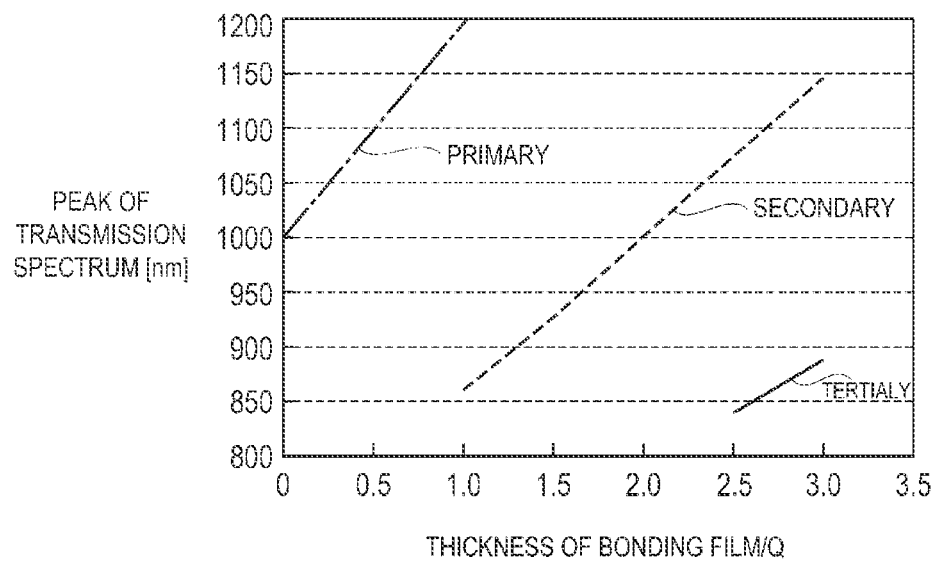
FIG. 7 is a graph illustrating a relationship between a film thickness and a peak of transmission spectrum at a bonding portion.
Figure 8:
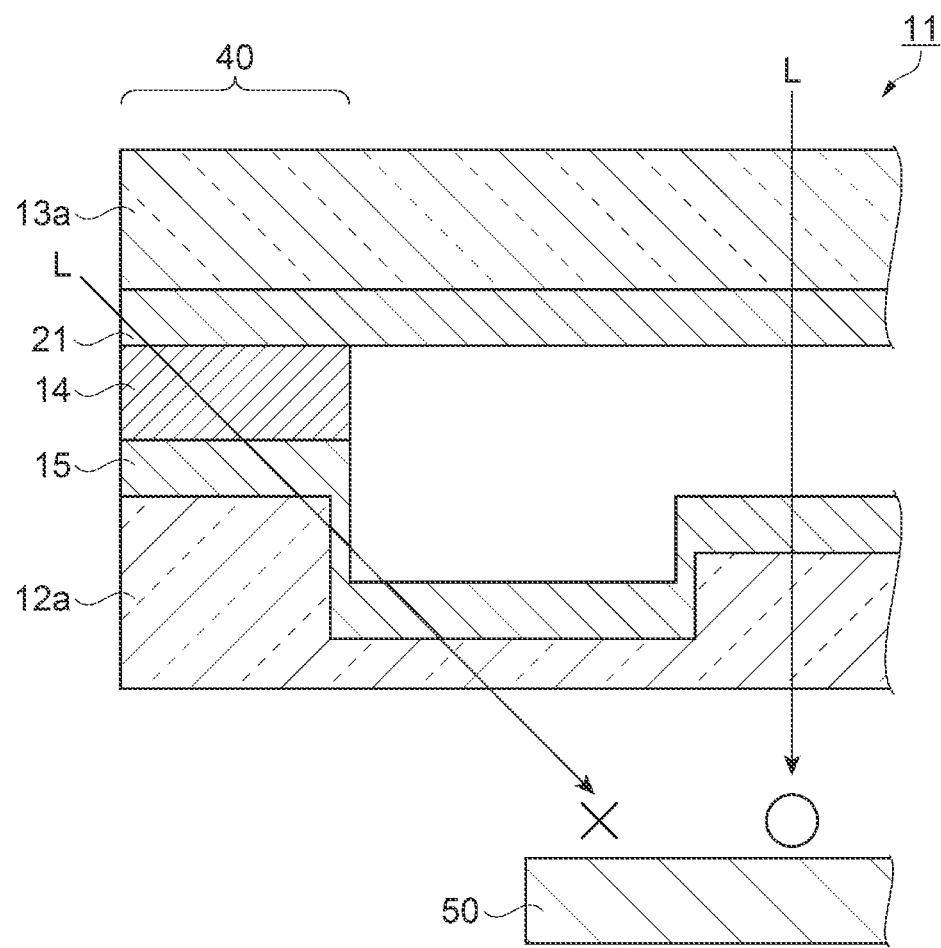
FIG. 8 is a cross-sectional view illustrating a state of transmission of light through a bonding portion.

Next, a method for determining the film thickness of the bonding film 14 of the bonding portion 45 will be described with reference to FIGS. 6 to 8. FIG. 6 is a graph illustrating the relationship between the wavelength of the light L and the transmittance of the light L, at the bonding portion 45, when the film thickness of the bonding film 14 is varied. FIG. 7 is a graph illustrating the relationship between the thickness of the bonding film 14 and a peak of transmission spectrum. FIG. 8 is a diagram illustrating a state of transmission of light L through the wavelength variable optical filter 11.

In the graph of FIG. 6, the horizontal axis indicates the wavelength (nm) of the light L, where the wavelength shifts from the visible light region to the infrared light region as going from the left side to the right side. Also, the vertical axis indicates the transmittance of the bonding portion 45, and the ratio of the transmitted light L becomes higher from the bottom to the top.

Specifically, there is indicated the relationship between the wavelength of the light L transmitted through the bonding portion 45 and the transmittance when the thickness of the bonding film 14 is changed by five types of "0", "0.5Q", "Q", "1.5Q", and "2Q".

For example, a case is assumed in which the wavelength band of the wavelength variable filter 11a ranges from 900 nm to 1100 nm. The center of the design wavelength in this case is set to 1000 nm (λ0=1000 nm). The configuration of the bonding portion 45 is just as illustrated in FIG. 5. The transmission spectrum at this time for each of the thicknesses of the bonding film 14 is indicated by the graph illustrated in FIG. 6.

Provided that the thickness of the bonding film 14 is 0 for example, the transmittance spectrum has a peak at a wavelength of 1000 nm, as illustrated in FIG. 6. For example, provided that the thickness of the bonding film 14 is set to 0.5 Q, the transmittance spectrum has a peak at a wavelength of 1100 nm. As such, it is possible for the transmittance in the spectral band (from 900 nm to 1100 nm) to be greatly reduced depending on the thickness of the bonding film 14.

Also, it is preferred to set the thickness of the bonding film 14 so as not to overlap with the peaks of primary light, secondary light, and tertiary light by viewing the relationship between the thickness Q of the bonding film 14 and the peak of the transmittance spectrum, as illustrated in FIG. 7.

That is, it is possible, by setting the film thickness of the bonding film 14 so that the peak of the light L is included in a wavelength band that is not included in the variable range of the peak wavelength of the wavelength variable filter 11a, to inhibit the light L of a wavelength to be measured (in other words, to be extracted) with the wavelength variable filter 11a from being transmitted through the bonding portion 45, and to suppress the light L of the wavelength extracted with the wavelength variable filter 11a from being incident, as stray light, from the bonding region 40 onto the filter region 41, as illustrated in FIG. 8. That is, it is possible to suppress the stray light from entering an image-capturing device 50. In addition, it is possible to optimally design the wavelength variable optical filter 11 corresponding to each of the wavelength bands.

As described above, the wavelength variable optical filter 11 of the first embodiment includes the first substrate 12 including the first filter region 41a and the first bonding region 40a, the second substrate 13 including the second filter region 41b and the second bonding region 40b, the bonding film 14 located between the first bonding region 40a of the first substrate 12 and the second bonding region 40b of the second substrate 13, in which the first filter region 41a and the second filter region 41b correspond to the wavelength variable filter 11a, the first substrate 12 includes the first base body 12a and the at least one first reflective film 15, the at least one first reflective film 15 being located on the first base body 12a within the first filter region 41a and within the first bonding region 40a, the second substrate 13 includes the second base body 13a and the at least one second reflective film 21, the at least one second reflective film 21 is located on the second base body 13a within the second filter region 41b and within the second bonding region 40b, the bonding film 14 is in contact with the first reflective film 15 and the second reflective film 21 to thus join the first substrate 12 and the second substrate 13, the bonding film 14 has transparency with respect to the light L in a predetermined wavelength range, an optical path extending through the first reflective film 15, the bonding film 14, and the second reflective film 21 has transparency with respect to the light L in the predetermined wavelength range, the optical path having no peak of transmittance with respect to a wavelength range measured by the wavelength variable filter 11a.

According to this configuration, the optical path of the bonding region 40 including the first reflective film 15, the bonding film 14, and the second reflective film 21 has no peak of transmittance in the wavelength range measured by the wavelength variable filter 11a, which makes it possible to suppress the light L of the wavelength extracted with the wavelength variable filter 11a from being incident, as stray light, from the bonding region 40 onto the filter region 41. This makes to possible to provide the wavelength variable optical filter 11 with high reliability.

Also, given that the film thickness of the bonding film 14 is Q, the peak wavelength of the light L is A, and the refractive index of the bonding film 14 is n, it is preferred to set, based on the formula below, the film thickness of the bonding film 14 to have a peak of the light L in a wavelength band that is not included in the variable range of the peak wavelength of the wavelength variable filter 11a. $Q=\lambda/4n$.

According to this configuration, it is possible, by performing calculation based on the above formula, to achieve a thickness of the bonding film 14 through which the light L of the wavelength extracted with the wavelength variable filter 11a is not transmitted, and to suppress the light L of the wavelength extracted with the wavelength variable filter 11a from being incident, as stray light, from the bonding region 40 onto the filter region 41.

Next, a configuration of a wavelength variable optical filter 111 of the second embodiment will be described with reference to FIG. 9.

Figure 9:
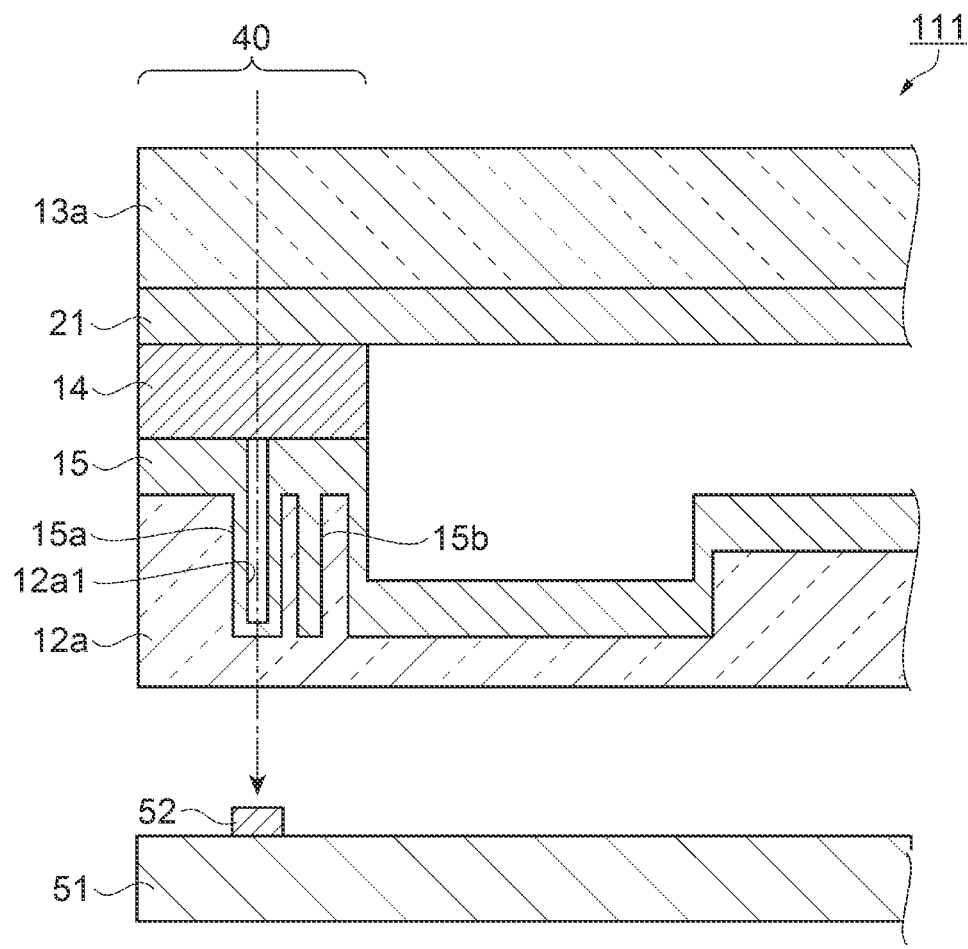
FIG. 9 is a cross-sectional view illustrating a structure of a wavelength variable optical filter of the second embodiment.

The wavelength variable optical filter 111 of the second embodiment differs from the wavelength variable optical filter 11 of the first embodiment at a part for providing, at the bonding region 40, a groove 12a1 for viewing an alignment mark 52, as illustrated in FIG. 9. Other configurations are substantially the same as those of the first embodiment. Thus, in the second embodiment, parts different from those of the first embodiment will be described in detail, and descriptions of the other redundant parts will be omitted as appropriate.

The wavelength variable optical filter 111 of the second embodiment is provided with the groove 12a1 as a deep recessed portion in a region, in the first base body 12a, overlapping with the alignment mark 52 in plan view (a direction viewed from the top side to the bottom side of the page in FIG. 9) in order to perform alignment with reference to the alignment mark 52 disposed on an alignment substrate 51. The first reflective film 15 is formed at the surface of the first base body 12a. Specifically, a first reflective film 15a is formed inside the groove 12a1. The inner side from the first reflective film 15a forms a hollow cavity (in other words, an air layer), for example.

It is possible, by providing the groove 12a1 at the first base body 12a to set the thickness of the first base body 12a, to transmit the light L other than the band, in other words, it is possible to change, from the other regions, how the region is viewed, to thus make it possible to visually recognize the alignment mark 52 by visual contact or a camera. This makes it possible to perform alignment using the bonding region 40 as an alignment. The wavelength of the light L transmitted through the groove 12a1 is included in a visible light region of a wavelength from 600 nm to 800 nm, as illustrated in FIG. 6.

As such, this makes it possible to perform alignment using visible light in case of alignment. This allows for an accurate alignment when aligning the alignment substrate 51 with the wavelength variable optical filter 111. Thereafter, it is possible, by cutting visible light (the light L outside the band) as the wavelength variable optical filter 11, to perform a measurement with reduced stray light. Note that the groove 12a1 may be provided in the bonding region of the second base body 13a.

Also, a first reflective film 15b may be embedded on the side of the filter region 41 from the groove 12a1 in the first base body 12a, as illustrated in FIG. 9. This makes it possible to prevent the light L incident from the bonding region 40 from being transmitted to the side of the filter region 41. That is, this makes it possible to suppress the light L from being incident on a light receiving element (not illustrated).

As described above, in the wavelength variable optical filter 111 of the second embodiment, the groove 12a1 is provided in a region, overlapping with the alignment mark 52, in a region, overlapping in plan view with the bonding film 14, at at least one substrate of the first substrate 12 or the second substrate 13.

According to this configuration, the groove 12a1 is provided in the region, at the bonding film 14, overlapping with the alignment mark 52, which makes it possible, based on the alignment mark 52, to align the first substrate 12 and the second substrate 13 without providing influence on the wavelength variable filter 11a, for example.

In the following, a modification example of the above-described embodiments will be described.

Figure 10:
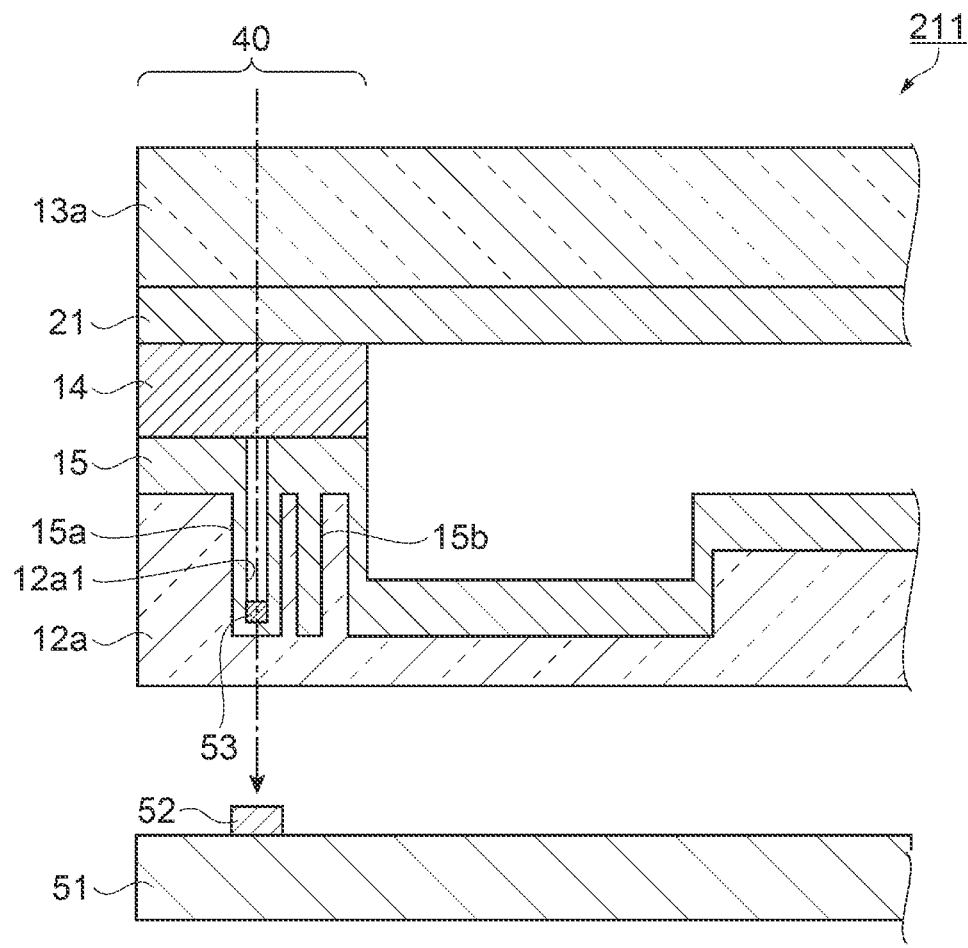
FIG. 10 is a cross-sectional view illustrating a structure of a wavelength variable optical filter of a modification example.

Note that the wavelength variable optical filter 111 of the second embodiment may have a configuration illustrated in FIG. 10 without being limited to the configuration described above. FIG. 10 is a cross-sectional view illustrating a configuration of a wavelength variable optical filter 211 of the modification example.

In the wavelength variable optical filter 211 of the modification example, a metal film 53 is disposed at the bottom portion of the groove 12a1 of the first base body 12a, as illustrated in FIG. 10. The thickness of the metal film 53 is designed to the degree that the alignment mark 52 is visually recognized, for example. This makes it possible to suppress the light L, diffusely reflected due to the groove 12a1, from being incident on the filter region 41 by passing through the first base body 12a.

Also, although not illustrated, an alignment mark may be provided in the bonding region 40 of at least one base body of the first base body 12a or the second base body 13a, in order to align, at the wavelength variable optical filter 11, the first substrate 12 with the second substrate 13. In this case as well, it is preferred to provide a groove or the like be provided so that the alignment mark is visually recognized in the visible light.

As such, it is preferred that an alignment mark be provided in a region, overlapping in plan view with the bonding film 14, at at least one substrate of the first substrate 12 or the second substrate 13. According to this configuration, an alignment mark is provided at a position overlapping with the bonding film 14, which makes it possible to align, based on the alignment mark, the first substrate 12 with the second substrate 13 without providing influence on the wavelength variable filter 11a, for example.

Also, a film separate from the first reflective film 15a may be disposed in a range in which the light L of visible light can be transmitted without being limited to form a hollow cavity inside the groove 12a1, as illustrated in FIGS. 9 and 10.

What is claimed is:

1. A wavelength variable optical filter, comprising:
   a first substrate including a first filter region and a first bonding region;
   a second substrate including a second filter region and a second bonding region, and
   a bonding film located between the first bonding region of the first substrate and the second bonding region of the second substrate, wherein
   the first filter region and the second filter region correspond to a wavelength variable filter,
   the first substrate includes a first base body and at least one first reflective film, the at least one first reflective film being located at the first base body within the first filter region and within the first bonding region,
   the second substrate includes a second base body and at least one second reflective film, the at least one second reflective film being located on the second base body within the second filter region and within the second bonding region,
   the bonding film is in contact with the first reflective film and the second reflective film, thereby bonding the first substrate with the second substrate,
   the bonding film has transparency with respect to light in a predetermined wavelength range, and
   an optical path extending through the first reflective film, the bonding film, and the second reflective film has transparency with respect to the light in the predetermined wavelength range, the optical path having no peak of transmittance with respect to a wavelength range measured by the wavelength variable filter.

2. The wavelength variable optical filter according to claim 1, wherein
   a film thickness of the bonding film is set, based on a formula below, to have a peak of the light in a wavelength band that is not included in a variable range of the peak wavelength of the wavelength variable filter, $$Q = \lambda/4n$$

where a film thickness of the bonding film is Q, a peak wavelength of the light is $\lambda$, and a refractive index of the bonding film is n.

3. The wavelength variable optical filter according to claim 1, wherein
   an alignment mark is provided in a region, overlapping in plan view with the bonding film, at at least one of the first substrate and the second substrate.

4. The wavelength variable optical filter according to claim 1, wherein
   a recessed portion is provided in a region, overlapping with an alignment mark, in a region, overlapping in plan view with the bonding film, at at least one of the first substrate and the second substrate.

\* \* \* \* \*